July 5, 1932.　　　　　I. H. JUDD　　　　　1,865,569
MEANS FOR TRANSPORTING VEHICLES AND THE LIKE
Filed March 4, 1931　　　9 Sheets-Sheet 2
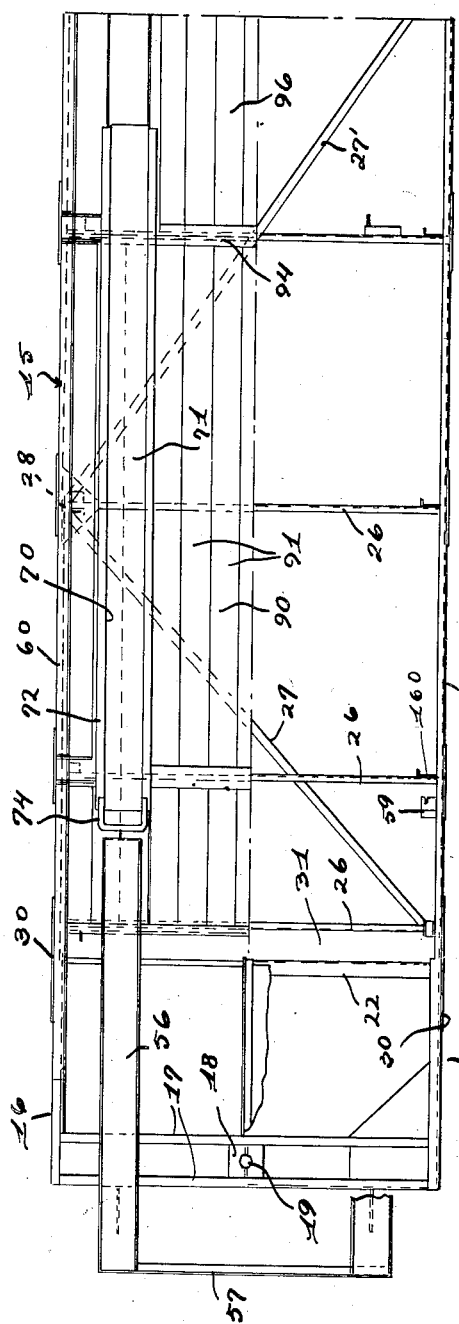
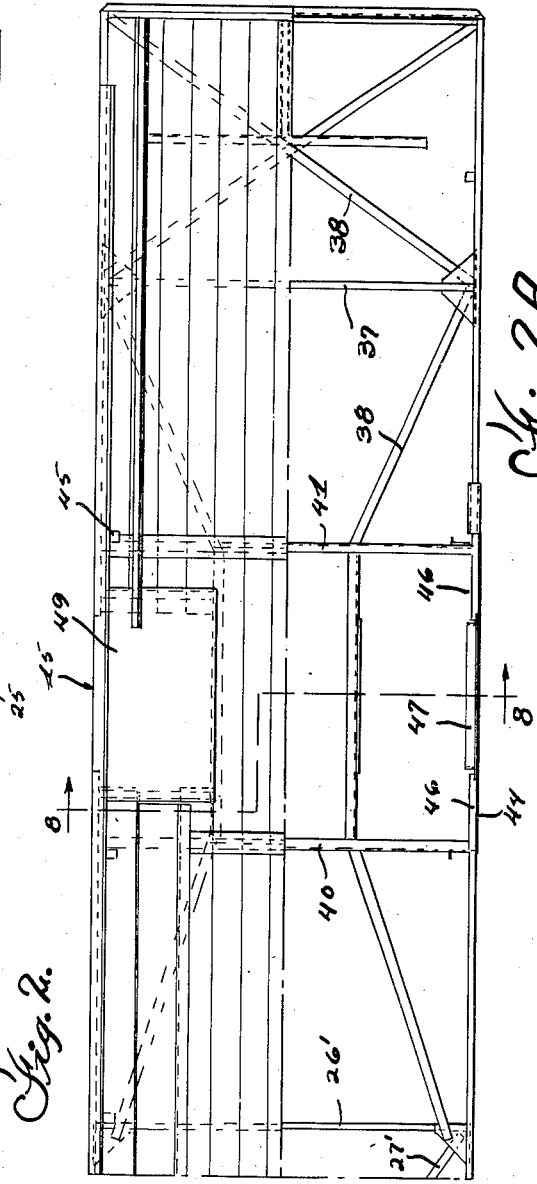
INVENTOR
*Irving H. Judd*
BY
*ATTORNEYS*

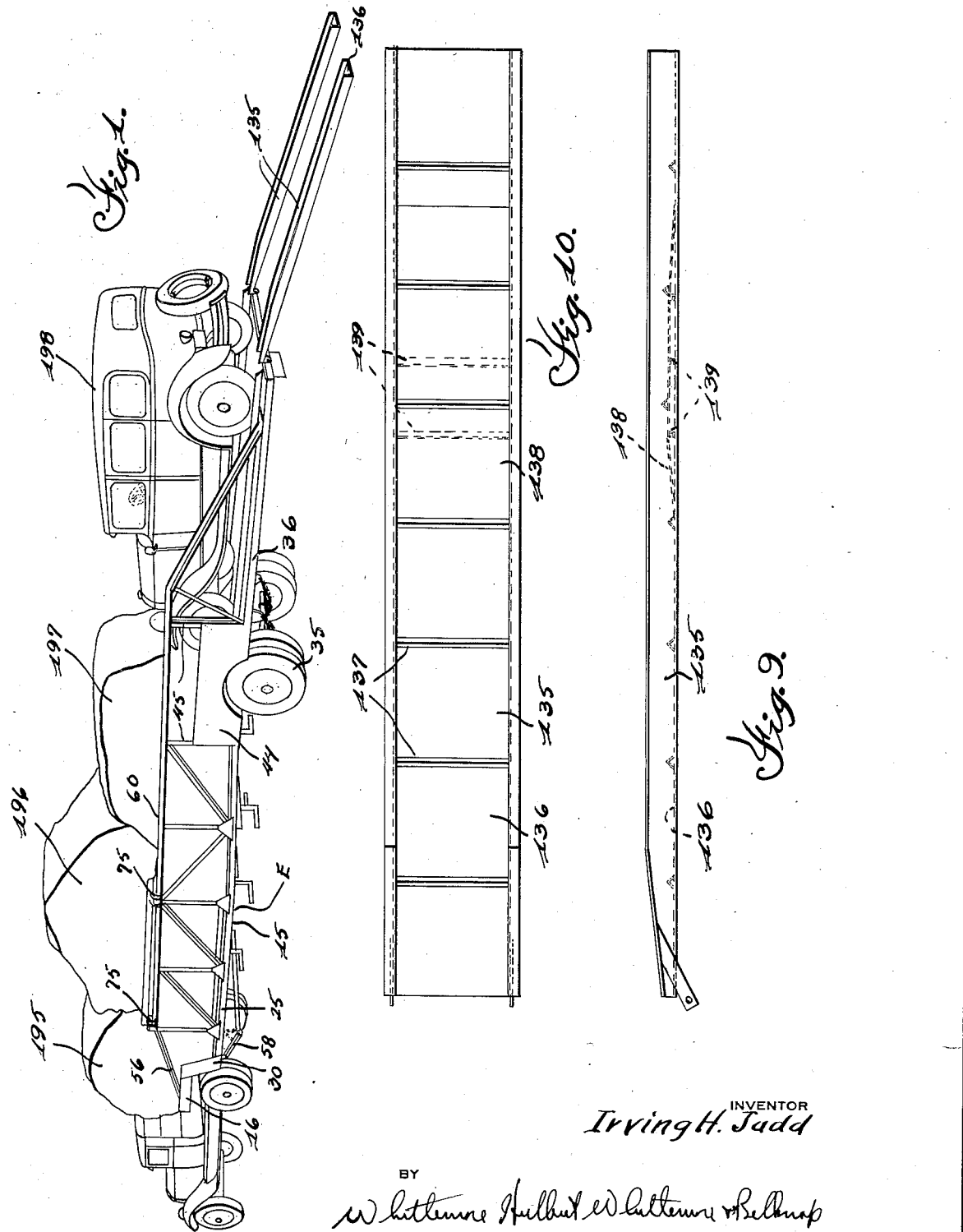

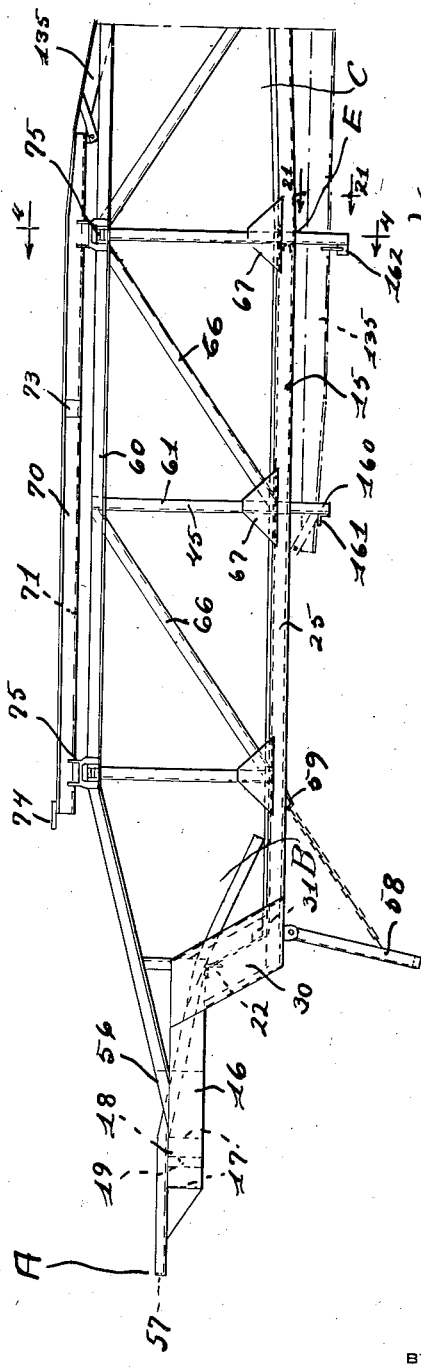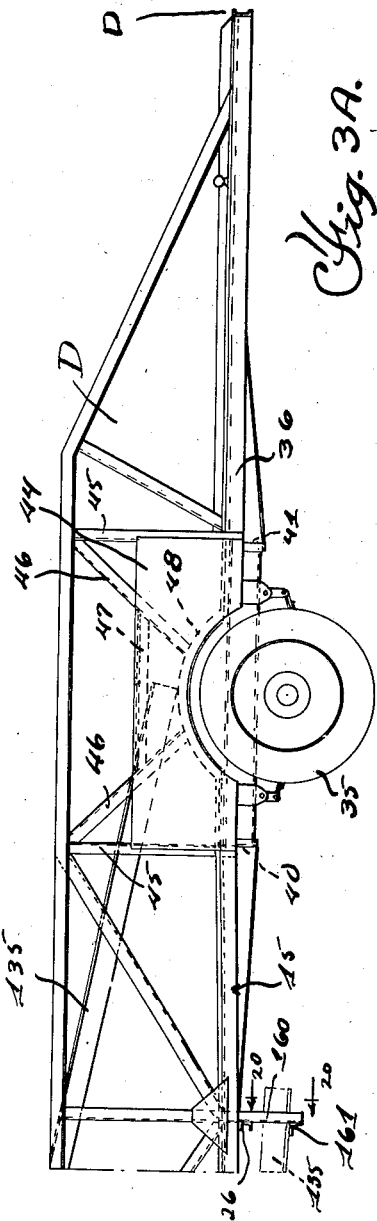

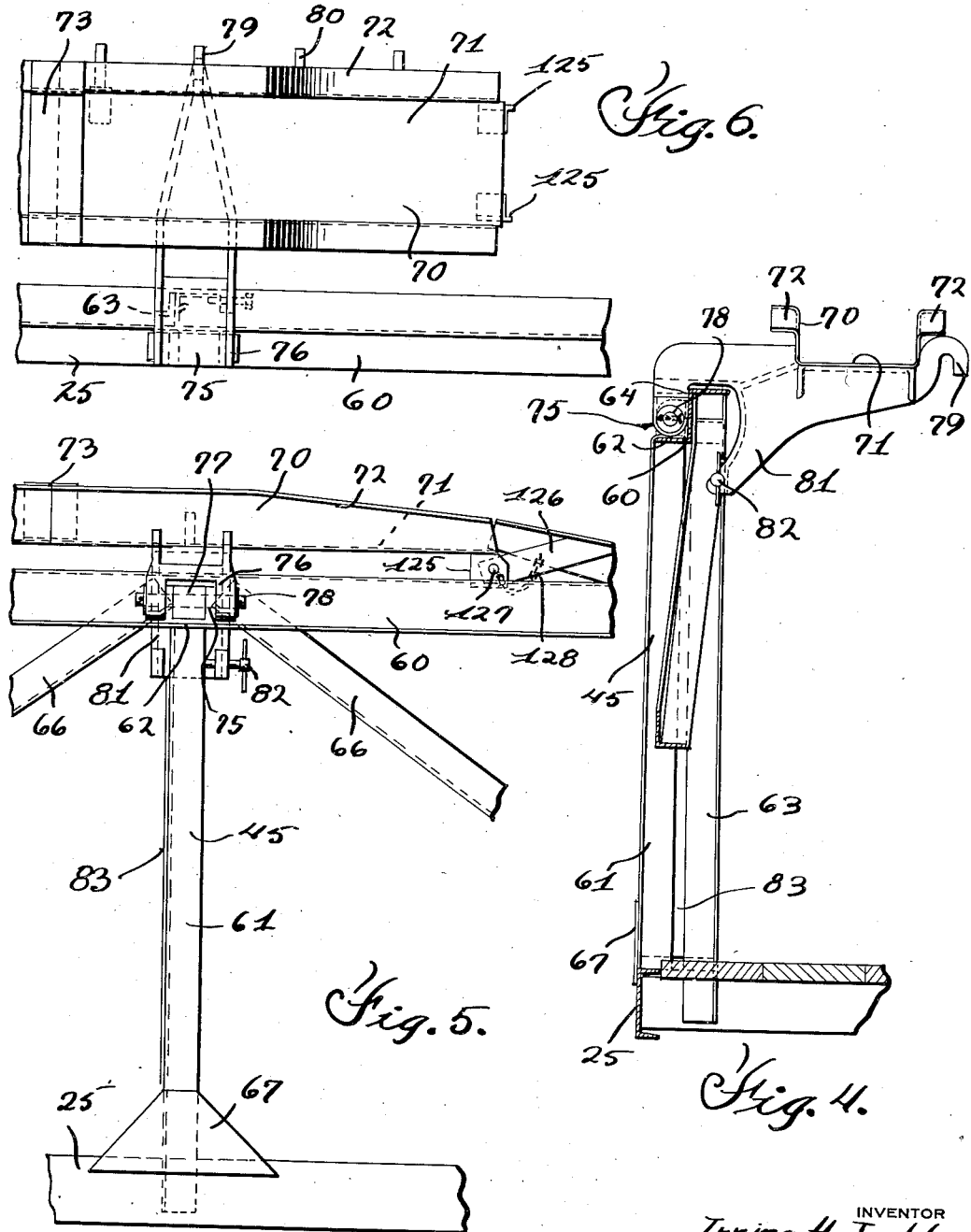

July 5, 1932.                I. H. JUDD                1,865,569
MEANS FOR TRANSPORTING VEHICLES AND THE LIKE
Filed March 4, 1931          9 Sheets-Sheet 5
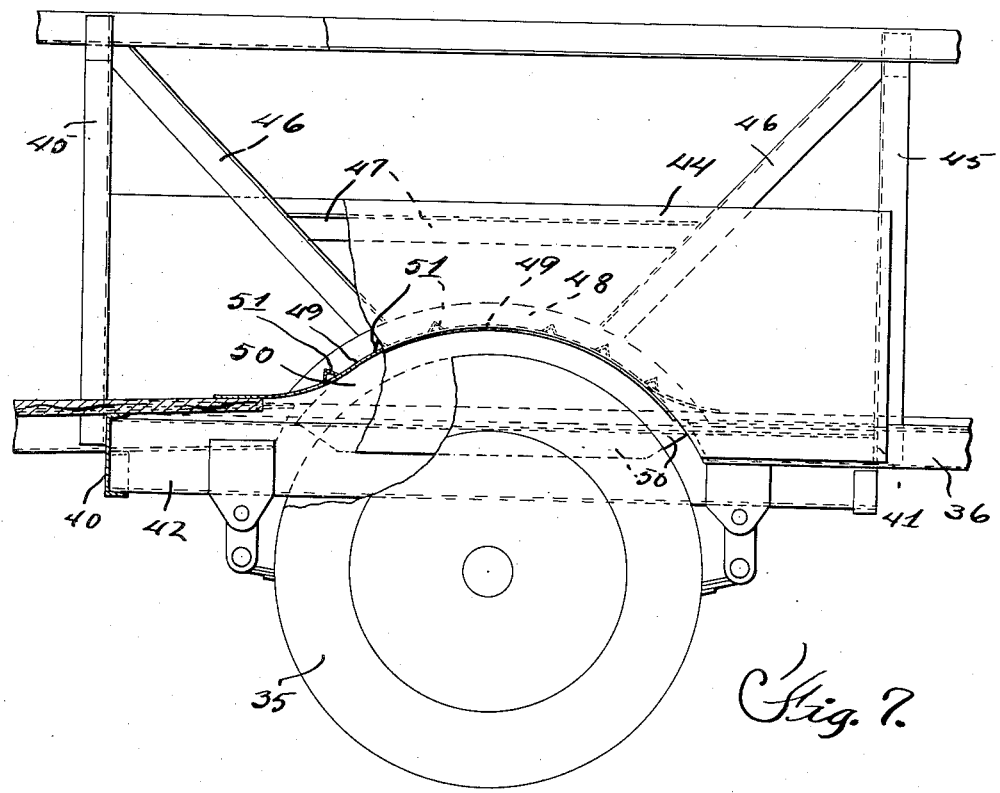
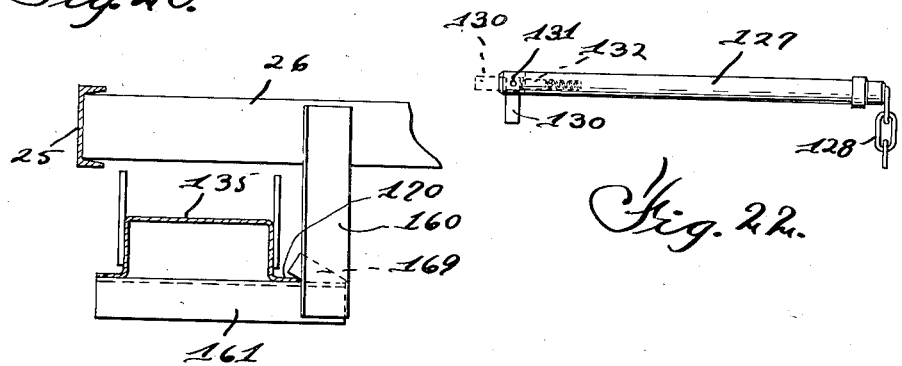
INVENTOR
Irving H. Judd
BY
ATTORNEYS July 5, 1932.  I. H. JUDD  1,865,569
MEANS FOR TRANSPORTING VEHICLES AND THE LIKE
Filed March 4, 1931   9 Sheets-Sheet 6

INVENTOR
Irving H. Judd

BY

ATTORNEYS

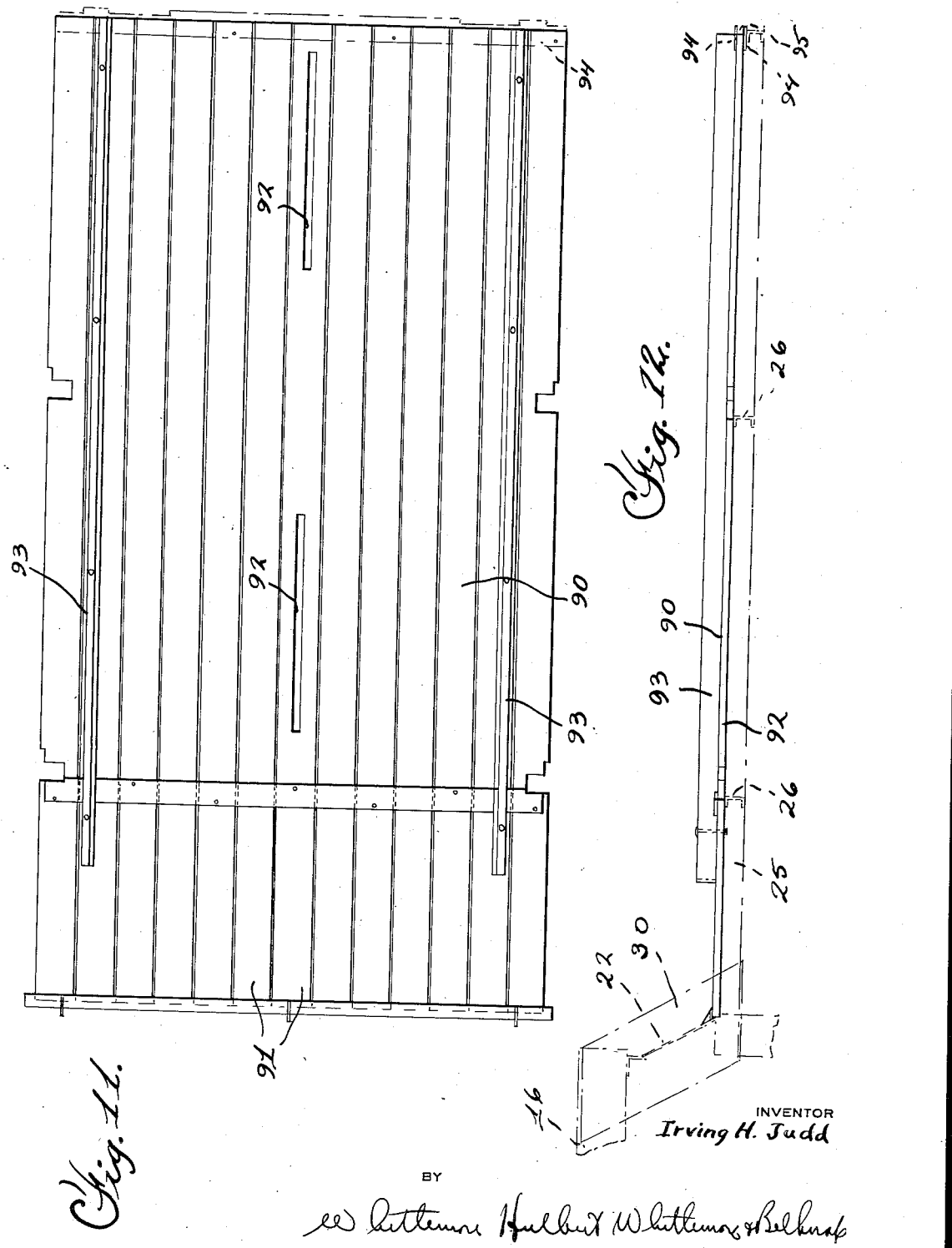

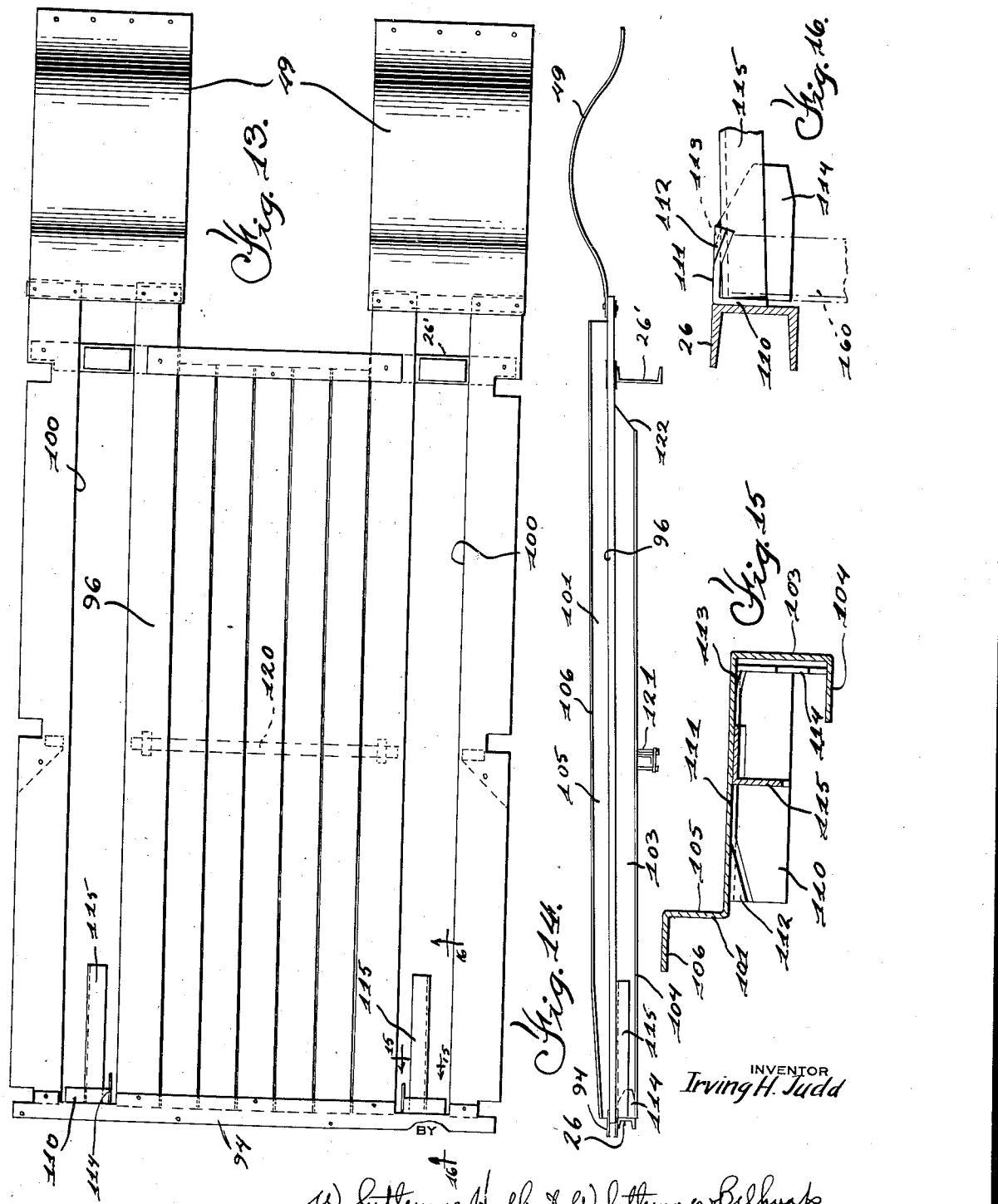

July 5, 1932.　　　　　I. H. JUDD　　　　　1,865,569
MEANS FOR TRANSPORTING VEHICLES AND THE LIKE
Filed March 4, 1931　　　9 Sheets-Sheet 9

INVENTOR
Irving H. Judd

BY

ATTORNEYS

Patented July 5, 1932

1,865,569

UNITED STATES PATENT OFFICE

IRVING H. JUDD, OF DETROIT, MICHIGAN, ASSIGNOR TO WHITEHEAD & KALES COMPANY, OF RIVER ROUGE, MICHIGAN, A CORPORATION OF MICHIGAN

MEANS FOR TRANSPORTING VEHICLES AND THE LIKE

Application filed March 4, 1931. Serial No. 520,175. REISSUED

This invention relates to transportation means of the character used in the transporting of vehicles such as automobiles and the like.

One of the primary objects of this invention is to provide a transportation means of the above mentioned character which will be within the limits as to length and width defined by the state statutes and which will nevertheless be capable of transporting at one time at least four vehicles of relatively long wheel base.

A further object of this invention is to provide a transportation means of the above mentioned character in which the vehicles to be transported may be "jackknifed"; that is, supported in partially overlapping relation with respect to each other.

A still further object of this invention is to provide a transportation means of the above mentioned character which will include supporting runways arranged one above the other and which will include means for mounting one of these runways for movement to a position out of vertical alignment with the other runway.

The invention still further contemplates the provision of skids for facilitating the positioning of vehicles on the transportation means, the provision of an improved means for carrying these skids, and the provision of an improved construction for anchoring the vehicles to be carried in position.

Numerous other objects and advantages of this invention will become more apparent as the following description proceeds, particularly when reference is had to the accompanying drawings, wherein:

Figure 1 is a perspective view of a transportation means constructed in accordance with the teachings of this invention;

Figures 2 and 2A together constitute a top plan view of the structure shown in Figure 1;

Figures 3 and 3A together constitute a side elevational view of the structure shown in Figure 1;

Figure 4 is a sectional view taken substantially on the line 4—4 of Figure 3;

Figure 5 is a side elevational view of a portion of the structure shown in Figure 3;

Figure 6 is a view similar to Figure 5 showing the track in inoperative position;

Figure 7 is an enlarged side elevational view of a portion of the structure shown in Figure 3A;

Figure 9 is an elevational view of a skid forming a part of the construction;

Figure 10 is a top plan view of the skid shown in Figure 9;

Figure 11 is a plan view of the front floor section of the structure shown in Figure 2;

Figure 12 is a side elevational view of the structure shown in Figure 11;

Figure 13 is a plan view of the center floor section of the construction;

Figure 14 is a side elevational view of the structure shown in Figure 13;

Figure 15 is a fragmentary sectional view taken substantially on the line 15—15 of Figure 13;

Figure 16 is a fragmentary sectional view taken substantially on the line 16—16 of Figure 13;

Figure 20 is a sectional view taken substantially on the line 20—20 of Figure 3A;

Figure 22 is a detail elevational view of a pin used for locking certain of the skids in operative position.

Figure 8:
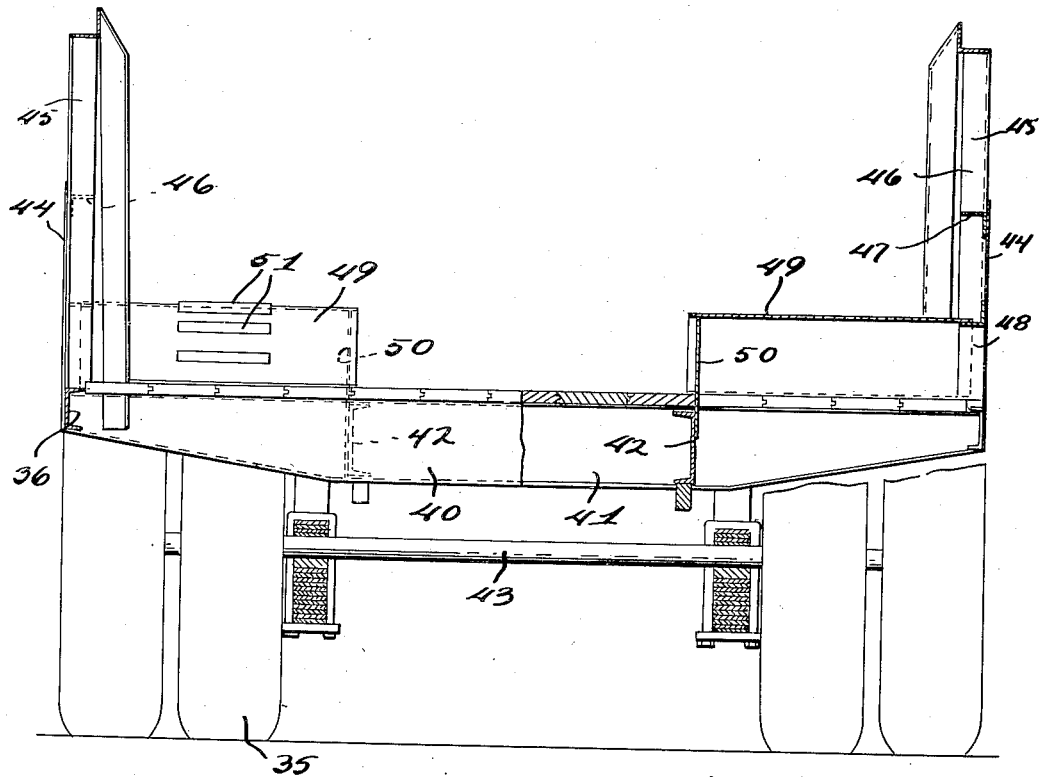
Figure 8 is a sectional view taken substantially on the line 8—8 of Figure 2A.

Referring then particularly to the drawings wherein like reference characters designate corresponding parts throughout all views, there is shown a semi-trailer which includes a main frame construction designated generally by the reference character 15. This main frame construction is elongated and may be divided throughout its length, for the purpose of aiding in the description thereof, into four portions designated by the reference characters A, B, C, and D, respectively.

The portion A is located at the forward end of the frame structure and is elevated relative to the remainder thereof so as to be adapted to overlie and rest upon the rear end of a truck or the like, as shown in Figure 1 of the drawings. This portion includes the longitudinally extending channel-shaped side members 16 which are connected adjacent their forward ends by the channel-shaped cross members 17. Located between these channel-shaped cross members and substantially centrally of the frame construction, is a casting 18 provided with an opening 19 for receiving a king-pin by which the semi-trailer may be connected to a truck or the like. The rear ends of the channel bars 16 are connected by a transversely extending angle bar 22 which also constitutes a partial support for track members which will hereinafter be more fully described.

The intermediate portion B of the frame construction constitutes a drop frame portion, being located a substantial distance below the plane of the portion A. The portion B includes the longitudinally extending channel-shaped side members 25 which are connected and braced at spaced points by the transversely extending channel members 26, the ends of these transversely extending channel members being located within and welded to the side channel members, as will be readily apparent. Diagonally extending bars 27 are also provided, these bars being connected to the the cross channel members 26 and the side channel members 25, as by welding or the like. Suitable gusset plates 28 are preferably provided for bracing the points of attachment of the cross and diagonal brace members to the side sill members.

For connecting the forward end of the portion B of the frame structure to the rear end of the portion A thereof, there are provided the gussets 30 which are secured at their lower ends to the forward ends of the channel members 25 and which are inclined upwardly and forwardly for connection to the sides of the rear ends of the channel members 16. A suitable plate 31 is also provided which extends between the gusset members 30, this plate being secured at its upper end to the depending leg of the angle bar 22 and being secured at its lower end to the web of the forward cross channel member 26.

The portion C of the frame structure is in a plane slightly above the plane of the portion B but is also substantially below the plane of the portion A of the frame structure. To form the portion C, the longitudinally extending channel-shaped side members are bent upwardly at E so that they rest upon the top of the transversely extending channel member 26', as clearly illustrated in Figure 3A of the drawing. It will be understood that the frame structure of the portion C is similar to the frame portion of the structure B in that the side and cross members are braced by diagonally extending braces 27' which are similar in all respects to the members 27.

The section C terminates at its rear end in a plane slightly in advance of the ground-engaging wheels 35, while the section D of the trailer terminates at its forward end in a plane slightly in the rear of the ground-engaging wheels 35. The section D of the frame includes the longitudinally extending channel-shaped side members 36 which are connected by the transversely extending channel members 37 and which are braced by the diagonal braces 38. Thus, the ground-engaging wheels are located between the front and rear ends of the sections D and C, respectively, of the frame structure and to form a supporting frame work for these wheels the following structure is provided.

The rear ends of the channel members 25 are secured to cross channel members 40, while the forward ends of the channel members 36 are secured to similar cross channel members 41. It will be noted that the members 40 and 41 have relatively wide intermediate portions and tapered end portions, as clearly illustrated in Figure 8 of the drawings so that the ends of these channel members may fit within and be welded to the webs of the side channel members. Longitudinally extending channel members 42 are secured at their ends to the cross members 40 and 41 and provide an axle supporting housing for supporting the axle 43 of the ground-engaging wheels 35. The cross members 40 and 41 and longitudinally extending members 42 thus constitute a framework which functions not only as an axle support but which functions also to connect the adjacent ends of the sections C and D of the frame structure.

A housing is provided for the portions of the ground-engaging wheels which project above the plane of the portions C and D of the frame structure, and this housing constitutes a support for the wheels of a vehicle supported on the frame structure. To accomplish this result, plates 44 are fixed to the outer faces of the adjacent ends of the side members 25 and 36, these plates extending upwardly and being welded at their ends to vertically extending supports 45, which supports constitute a portion of an elevated frame structure hereinafter to be more fully described. Suitable diagonal braces 46 and a longitudinally extending brace 47 are also provided for reinforcing each plate 44.

Fixed to the inner face of each plate 44 is an angle bar 48, this angle bar being arcuate in elevation and extending from the rear end of the section C to the forward end of the section D of the frame structure. The horizontal leg of this angle bar constitutes a support for a curved plate 49 and the opposite end of this plate is supported by a plate 50 which is welded to the web of the adjacent longitudinally extending channel member 42.

Thus there is provided a plate 49 over each pair of ground-engaging wheels 40 and these plates overlie the adjacent ends of the sections C and D. These plates thus constitute not only housings for the upper edges of the ground-engaging wheels but also constitute elevated wheel supports above the main plane of the frame structure. It will be noted that a series of angle bars 51 are fixed to the upper surface of each plate 49 and extend transversely thereof to provide traction for the wheels of vehicles being driven over the plates 49.

Supported on the portion A of the frame structure is a pair of track members 56. The track members project forwardly beyond the ends of the channel members 16 and the forward ends of the track members are connected by an angle bar 57. The track members extend rearwardly in a horizontal plane to beyond the edge of the rear cross member 17, at which point the track members are inclined downwardly to rest upon the cross member 22. Beyond the cross member 22 each track member is further inclined downwardly so that at its rear end it terminates in the plane of the portion B of the trailer. Thus, a vehicle run longitudinally of the portion B of the trailer may be run up the track 56 so that the wheels at one end thereof may be positioned at the front ends of the track sections 56, it being noted that the vertical leg of the angle bar 57 constitutes a stop for the wheels of this vehicle.

For supporting the forward end of the trailer when the latter is disconnected from a truck, legs 58 are pivotally connected to the lower faces of the channel members 25 adjacent the forward ends thereof. These legs may be braced in operative position, as shown in Figure 3 of the drawings, or may be retained in inoperative position by chains which are secured to these legs and which are adapted for adjustable connection to keepers 59 carried by the members 25. It will be noted that the keepers are slotted so that any link of the chain may be engaged with the same.

The invention further contemplates the provision of an elevated frame structure which includes the longitudinally extending side members 60 and the supports 45 which support the side members from the main frame structure previously described. Each longitudinally extending frame member 60 is substantially L shaped in cross section, as illustrated in Figure 4 of the drawings, and each support 45 comprises an angle bar 61 welded at its lower end to the upper face of the adjacent channel member forming a side of the main frame structure and welded at its upper end to the under face of the portion 62 of the member 60. Each support also includes an angle bar 63 which is slightly longer than the angle bar 61 and which is welded at its lower end to a side of one of the cross members of the main frame structure and which is welded at its upper end to the inner face of the vertical leg 64 of the member 60. Suitable diagonal braces 66 are also provided for reinforcing the support of the member 60, there being provided gusset plates 67 which reinforce the connections of the diagonal braces 66 and the angle bars 61 with the side channel members of the main frame structure.

At their forward ends the members 60 are inclined downwardly and secured to the upper faces of the channel members 16, while at the rear ends the members 60 are inclined downwardly and are secured to the upper faces of the rear ends of the channel members 36. It will be understood that the members 60 are in substantially vertical alignment with the channel members forming the sides of the main frame structure and that the members 60 and the supports therefor are spaced sufficiently far apart to permit the passage therebetween of vehicles to be carried on the floor of the main frame structure.

It constitutes a further feature of this invention to provide an elevated runway which is supported by the elevated frame structure and which is movable from a position above the floor of the portion B of the main frame structure to a position to one side thereof. This runway comprises a pair of track sections 70, these track sections being spaced apart the proper distance to receive the wheels of a vehicle. Each track section is substantially U-shaped in cross section, as shown in Figure 4 of the drawings, the web 71 of each track section being of sufficient width to receive a wheel of a vehicle to be carried. Laterally extending reinforcing flanges 72 may be formed on the free edges of the legs of the track sections and, if desired, each track section may be formed in two sections secured together by a band 73 in the manner clearly illustrated in Figures 5 and 6. At the forward end of each track section a U-shaped rod 74 has its leg portions welded or otherwise fixed to the flanges 72 and constitutes a stop for the wheels of vehicles supported on these track sections.

The track sections are hingedly supported from the members 60 by means of brackets designated generally by the reference character 75. There are preferably two brackets for each track section, one being located adjacent each end thereof and each bracket is pivotally supported from the adjacent portion of the member 60. Thus each bracket is provided with a yoke portion 76 adapted to embrace a boss 77 formed on the outer face of the portion 64 of the member 60. A pivot pin 78 extends throughout the yoke portion of the bracket and through the boss forming a pivotal connection between the two.

The body portion of each bracket is preferably recessed to receive the track section 70 which is welded in the recess in the bracket member, as clearly illustrated in Figure 4 of the drawings. At the inner side of the track section the bracket member terminates in a hook 79 to which an anchor chain for anchoring a vehicle on the track section may be secured, and to the inner edge of each track section, adjacent the hook 79, additional hooks 80 are secured. Thus a series of hooks are provided adjacent each end of each track section to facilitate the anchoring of vehicles of different lengths on the track sections and to provide for adjusting the position of the vehicle being carried by the track sections longitudinally thereof, as will be readily apparent.

Depending from the body section of each bracket is an arm 81 which mounts a set screw 82 adapted to be threaded into engagement with the member 63 of an adjacent support 45, as clearly illustrated in Figure 5 of the drawings. Thus, when the brackets are swung to the position shown in Figure 4 of the drawings, the set screws may be threaded inwardly to lock the brackets in this position and to thus hold the track sections in operative position. It will be understood that the track sections may be swung from their operative positions, such as shown in the above mentioned figure, to positions outside of the members 60, in which latter positions they will be out of vertical alignment with the floor section of the portion B of the trailer. The hinged brackets are preferably mounted on the member 60 adjacent the point of connection of certain of the supports 45 to this member and for bracing these supports, suitable plates 83 are fixed to the adjacent legs of the angle bars 61 and 63 forming these supports. These plates, when secured to these angle bars in this manner will prevent these supports from being bowed outwardly by virtue of the weight of the vehicle supported on the track sections.

A floor is provided for the main framework above described and this floor is preferably formed in three sections which may be conveniently designated as front, center, and rear sections. The front section 90 is shown in Figures 11 and 12, and extends from adjacent the gussets 30 to a point spaced a substantial distance rearwardly thereof. The floor section 90 includes a plurality of planks 91 which are supported on the side and cross members of the main framework. Substantially centrally of the floor section 90 and extending longitudinally thereof, suitable slots 92 are formed for a purpose which will hereinafter be more fully described, while side rails 93 are fixed to the floor section adjacent the sides thereof. Fixed to the upper and lower faces of the rear end of the floor section and projecting beyond the end thereof are plates 94 which provide a groove or recess 95 for receiving the forward end of the center floor section about to be described.

The center floor section is designated by the reference character 96 and is similar to the section 90 in that it is formed of a plurality of longitudinally extending planks. The forward end of this floor section is adapted to fit in the pocket 95, as will be readily understood, while the plates 49 are fixed to the rear end of this section.

It constitutes a feature of the invention to adapt the center section for carrying the skids which are used for running vehicles from the main frame structure up and on to the elevated track members. To accomplish this, relatively wide slots 100 are formed in the center floor section adjacent the sides thereof. Each of these slots is of a sufficient width to receive a skid section 101 and means are provided for holding these skid sections in position within the slots when the same are not in use.

Each skid section includes a floor portion 102 of sufficient width to receive the wheels of a vehicle. At its inner side each skid section is provided with a downwardly extending reinforcing flange 103 which terminates in a laterally bent flange 104 which extends inwardly toward the center of the skid section. At its outer side each skid section is provided with an upwardly extending reinforcing flange 105 which terminates at its upper end in a laterally bent reinforcing flange 106 which extends outwardly and away from the center of the skid section.

Fixed to the cross frame member 26 at the forward end of the floor section 96 is an angle plate 110. This angle plate is relatively short in length and extends across the front of the slot 100. A horizontal leg 111 of this angle plate is bent downwardly at its outer end, as designated by the reference character 112, and is slightly beveled adjacent its inner end, as designated by the reference character 113. A locking plate 114 is welded to the angle plate 110 and extends in the direction of the length of the slot 100. Fixed to the angle plate 110 and in parallel spaced relation to the plate 114 is an angle bar 115 which extends a substantial distance beyond the free end of the plate 114, as clearly illustrated in Figures 15 and 16 of the drawings.

When the skids 101 are not in use, they are moved forwardly of the floor section 96 to a position where their front ends may be engaged with the locking plate 114. When in this position the rear ends of the skids will be supported on the cross member 26' and the flanges 103 and 105 will project respectively below and above the floor 96. Intermediate their ends the skid sections will be supported on the intermediate cross member 26' between which and the planks of the floor section 96 a suitable reinforcing strip 120 may be positioned. If desired, suitable bolts 121 may be provided for holding the reinforcing strip 120 in position.

When it is desired to use the skids, the same are drawn rearwardly to disengage the front ends thereof from the plates 114, the depending flanges 103 of the skid sections being beveled, as at 122 to permit this rearward movement. The skid sections may then be drawn upwardly, during which time their forward ends will be supported on the carrier bracket members 115. When the skid sections have been fully withdrawn from the slots 100 they may be positioned with their rear ends on the plates 49 and their forward ends adjacent the rear ends of the elevated track sections to provide for the running of a vehicle on to the elevated track section, as will be readily apparent.

To hold the skids in this latter position, there are fixed to the rear end of each track section angle plates 125. Metal straps 126 are secured to the forward end of each skid section and these straps and the angle plates are apertured to receive a pin 127 which may be suspended by a chain 128 from one of the straps 126. Thus, each skid may be connected to the rear end of one of the track sections to extend from this track section to the raised portion at the rear of the section C of the main frame, as clearly illustrated in Figure 3A of the drawings.

Each pin 127 is preferably provided adjacent its free end with a latch member 130 pivotally mounted as at 131. A spring-pressed plunger 132 is adapted to engage either a side or an end of the latch member to hold the same either in the latching position shown in full lines in the drawings or in the position shown in dotted lines. In the latter position it will be noted that the latching member is axially aligned with the pin so that the pin may be inserted through the apertures in the angle plates and straps.

It will be noted that the forward end of each skid is so connected to the rear end of its respective track section as to eliminate a sharp angle at this point, as illustrated in Figure 5 of the drawings, and this connection provides for the driving of vehicles of long wheel base up the skids and on to the elevated track sections without danger of the running boards of the vehicles scraping over the forward ends of the skids or the rear ends of the track sections.

To facilitate loading of vehicles to be carried on the vehicle supporting portions of the main frame, there are provided skid members 135, such as shown in Figures 9 and 10 of the drawings. Each skid is substantially channel shaped in cross section, the web 136 thereof constituting a runway for the wheels of vehicles. Extending transversely of the web 136 and at spaced points longitudinally thereof, are angle bars 137 which constitute ribs for increasing the traction of wheels passing over the skid, while intermediate the ends of the skid there is provided a slightly elevated portion formed by the plate 138 which is supported above the web 136 by transveresly extending channel bars 139. This latter raised portion aids in preventing the running board of a vehicle being moved up the skid from scraping over the forward end of the skid or the rear end of the main framework.

Figure 21:
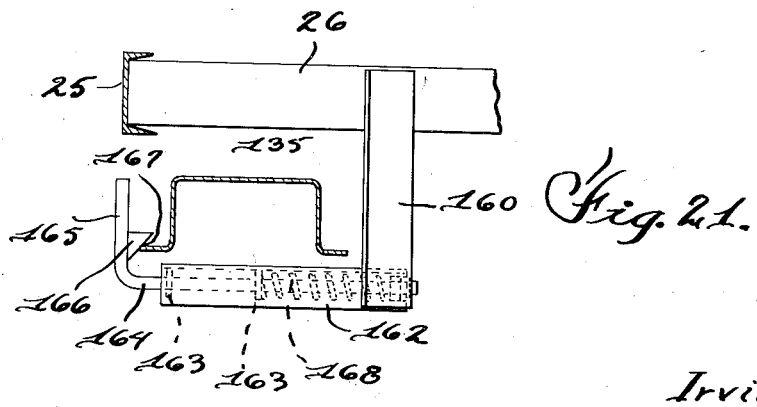
Figure 21 is a sectional view taken substantially on the line 21—21 of Figure 3.

For transporting the skid sections 135 when the same are not in use, the structure shown in Figures 3, 20, and 21 is provided. By reference to these figures it will be noted that depending angle members 160 are fixed at their upper ends to certain of the cross frame members 26. Fixed to the lower ends of the members 160 are angle bars 161 which extend laterally, as clearly shown in Figure 20 of the drawings. Preferably three depending members 160 are provided and laterally extending supporting bars 161 are secured to the end two of these members. The skid sections 135, when inverted in the manner clearly illustrated in Figures 20 and 21, are adapted to rest on the horizontally projecting members 161 in the manner illustrated.

Supported by the middle depending member 160 is an angle bar 162 which is below the plane of the angle bars 161 and which does not therefore constitute a support for the skid sections. Slidably mounted in bearings 163 carried by the member 162 is a rod 164 which terminates at its outer end in an upwardly turned portion 165 to which is secured a lug 166 having an inclined lower face 167. A spring 168 sleeved on the rod 164 normally urges the same inwardly to engage the lug 166 with the outer flange of the skid section, as clearly illustrated in Figure 21 of the drawings.

Fixed to the inner ends of the members 161 are plates 169 which extend at an inclination above the members 161 to provide sockets 170 for receiving the inner flange of the skid section. Thus when the skid sections are placed on the members 161, the rod 165 may first be moved outwardly to engage the lug 166 with the outer flanges of the skid sections, after which the rod may be released with the result that the spring will draw the rod inwardly thus causing the inclined face on the lug to force the skid sections inwardly, whereby the inner flanges thereof will be engaged beneath the plates 169. Thus the skid sections 90 may be rigidly supported at one side of and below the main floor of the trailer.

Figure 17:
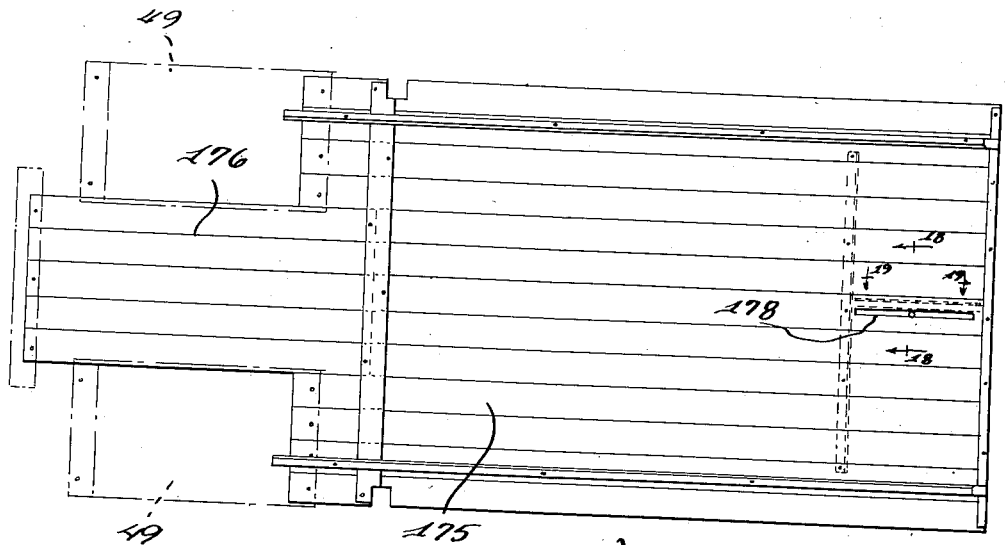
Figure 17 is a plan view of the rear floor section of the construction.

The rear floor section of the trailer is designated by the reference character 175 and extends from the rear of the plates 49 to the rear end of the trailer, as clearly illustrated in Figure 17 of the drawings. At its forward end this floor section is provided with a reduced extension 176 adapted to extend between the plates 49 to thus close the space between these plates.

Figures 18, 19:
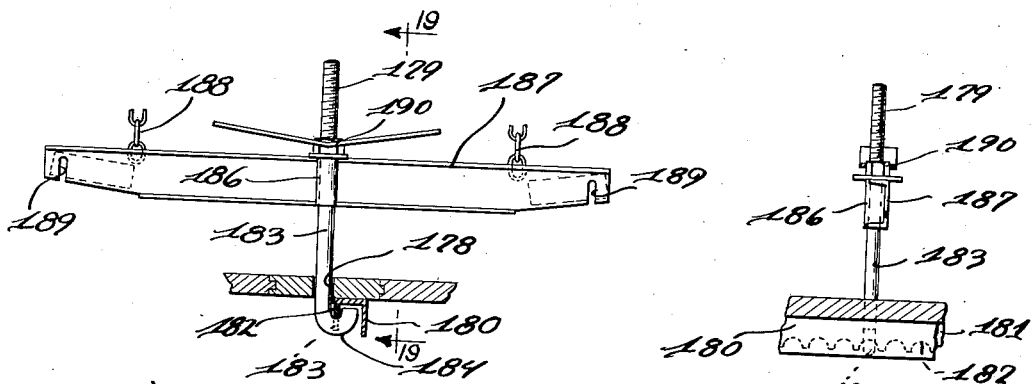
Figure 18 is a sectional view taken substantially on the line 18—18 of Figure 17.
Figure 19 is a sectional view taken substantially on the line 19—19 of Figure 18.

The floor section 175 is provided with a longitudinally extending slot 178 which is similar to the slots 92 formed in the front floor section. These slots are adapted to permit the passage through the floor sections of anchor members for the purpose of holding vehicles to be carried in position, and it constitutes a feature of this invention to provide an improved means for this purpose. Referring then particularly to Figures 18 and 19 of the drawings, it will be noted that an angle bar 180 is fixed to the under face of the floor section and extends parallel to the slot 178. Welded to this bar to project downwardly from the horizontal leg of the same, is a plate 181 provided on its free lower edge with a series of recesses 182. A rod 183 is provided on its lower end with a hook 184 adapted to be engaged in any one of the recesses 182 and this rod extends upwardly through the slot 178 and is threaded throughout the major portion of its length, as designated by the reference character 179.

Sleeved on the threaded portion of the rod 183 is a sleeve 186 which is fixed to a channel member 187 intermediate the ends of the same. Chains 188 are fixed to the channel members 187 at points spaced from the ends thereof and these chains are adapted to be hooked over the springs or the like of a vehicle to be anchored and then hooked in slots 189 formed in the channel bar 187 adjacent the ends thereof. A nut 190 threaded on the rod 183 above the channel member 187 provides means for drawing the channel member downwardly to clamp the vehicle in position.

In use, the rods 183 may be adjusted longitudinally of the slots and hooked in any one of the recesses 182. After the rods have been properly positioned, the chains carried by the channel member 187 may be engaged with a vehicle and the nut 190 may then be tightened to clamp the vehicle firmly in place. It will be understood that while the clamping means has been described as being associated with the slot 178, a similar clamping means is associated with each slot 92.

In use, vehicles may be loaded on the transportation means above described in the following manner. The skid sections 135 may first be associated with the rear end of the main frame structure and the first vehicle, designated by the reference character 195, may be run forwardly to the position shown in Figure 1 of the drawings. It will be understood that during movement of this vehicle to this position the elevated track sections will be swung laterally out of vertical alignment with the main floor of the trailer. Thus this vehicle may be positioned with its rear wheels on the elevated forward end of the trailer while its front wheels are supported on the floor adjacent the forward end of the intermediate portion of the main frame structure.

The skid sections 101 may then be placed in operative position and a second vehicle, such as designated by the reference character 196, may be run up these skid sections on to the track sections 70 where it may be anchored in place by chains secured to the hooks provided for this purpose. Obviously, the series of hooks provide for anchoring vehicles of different length on the elevated track sections and also provide for adjusting the position of the vehicle longitudinally of the elevated track sections.

A third vehicle 197 may then be run forwardly of the main frame to a position where its forward end is under the rear end of the track sections 70, while its rear end is supported on the rear end of the section C of the main frame structure.

The fourth vehicle 198 may then be run on to the section C of the main frame structure with either its rear or front wheels positioned on the elevated track section formed by the plates 44. Thus, the end of this last vehicle which is supported on the elevated portion of the section C will be slightly out of the plane of the adjacent end of the vehicle 197 to permit "jackknifing" or overlapping of the bumpers, springs, horns, etc., of these two vehicles. Thus, four vehicles may be supported in partially overlapping relation with respect to each other and one or more of these vehicles may be of relatively long wheel base without necessitating the use of a trailer of greater length than that allowed by statute.

It will be noted that the invention provides for a double overlapping of the vehicles. Thus the vehicle 196 supported on the elevated track sections overlaps the adjacent ends of both of the vehicles 195 and 197 without, however, being elevated to an extent beyond that allowed by law. It will further be noted that the vehicles which are supported in inclined position, such as the vehicles 195 and 197, are but slightly inclined with the result that the oil in these vehicles will not be drained from the same.

From the above it will be apparent that the invention provides a transportation means which includes a main frame having an elevated forward portion, an intermediate drop portion, and a rear portion elevated with respect to the intermediate portion but below the plane of the forward portion. Associated with this main frame structure is a flooring constituting a runway for the wheels of vehicles to be carried, and supported by an auxiliary elevated frame, are track sections which are movable to a vehicle supporting position immediately over a portion of the runway on the main frame structure. These track sections are, however, movable to inoperative positions to permit the passage of a vehicle under the same on the runway of the main frame structure.

It will be further noted that a large portion of the floor of the section B of the main frame, and particularly that portion of this floor which is between the adjacent ends of the vehicles 195 and 197, will be free for the carrying of spare parts, tools or the like, so that the invention also provides a transportation means capable not only of carrying four vehicles at one time, but capable also of carrying additional cargo.

While the invention has been described with some detail, it is to be understood that the description is for the purposes of illustration only and that the right is reserved to make such changes in the details of construction and arrangement of parts as will fall within the purview of the attached claims.

What I claim as my invention is:

1. In a transportation means of the class described, a main frame of sufficient length to receive a plurality of vehicles arranged end to end, means providing a runway extending longitudinally of the main frame whereby vehicles to be carried may be moved longitudinally of said main frame, a second frame elevated with respect to said main frame, and track sections carried by said second frame and movable from an operative vehicle supporting position vertically above the runway on said main frame to an inoperative position to one side of the runway on said main frame.

2. In a transportation means of the class described, a main frame having a portion constituting a runway of sufficient length to receive a plurality of vehicles arranged end to end, a pair of track sections spaced apart a sufficient distance to receive the wheels of a vehicle to be carried, and means mounting said track sections in a plane above the plane of the runway of said main frame for movement from a vehicle supporting position in vertical alignment with the runway of said main frame to a position out of vertical alignment with the runway of said main frame to provide for the movement of vehicles longitudinally of said main frame below said track sections.

3. In a transportation means of the class described, a main frame having a runway of sufficient length to receive a plurality of vehicles arranged end to end, a pair of track sections, and means mounting said track sections at a point intermediate the ends of said main frame for movement from an operative vehicle supporting position in vertical alignment with the runway of said main frame to an inoperative position to one side of the runway of said main frame whereby said track sections may be moved to inoperative positions to permit the moving of a vehicle longitudinally of said main frame and below said track sections.

4. In a transportation means of the class described, a main frame including longitudinally extending channel shaped side frame members and transversely extending channel shaped cross frame members, and auxiliary frame including longitudinally extending side members of structural steel, and supports for supporting said auxiliary frame from said main frame, each support including a pair of bars, one of said bars engaging the upper flange of the side channel shaped member of said main frame and a flange of said structural side member of the auxiliary frame and the other of said bars being relatively longer than the first mentioned bar and being secured to the side of said cross channel bar of the main frame and to another flange of said structural steel member of the auxiliary frame.

5. In a transportation means of the class described, a main frame, an auxiliary frame supported in a plane above said main frame, said auxiliary frame including longitudinally extending side frame members of structural steel, brackets hingedly connected to the side frame members of said auxiliary frame, and track sections carried by said brackets for movement to a vehicle supporting position above the plane of said main frame.

6. In a transportation means of the class described, a main frame having a rear portion slightly above the plane of the intermediate portion thereof, a pair of track sections supported above the intermediate portion of said main frame and constituting a support for the wheels of a vehicle to be carried, ground-engaging wheels for said main frame, housings for the upper edges of said ground-engaging wheels, and skids adapted for positioning between the ends of said track sections and the uppermost portions of said housings to provide for the running of a vehicle from the rear portion of said main frame to a position on said track sections.

7. In a transportation means of the class described a main frame, a pair of substantially horizontally arranged supporting arms carried by said main frame and adapted to support a skid, and means arranged intermediate said supporting arms for yieldably holding a skid in position thereon.

8. In a transportation means of the class described, a main frame, a pair of brackets secured to said main frame and depending therefrom, horizontally arranged supporting arms carried by said brackets and constituting a support for a skid, a third bracket arranged intermediate said first mentioned brackets and depending from said frame, a horizontal arm carried by said last mentioned bracket, and resilient means carried by said arm for holding a skid in position on said first mentioned supporting arms.

9. In a transportation means of the class described, a main frame, an elongated member fixed to the said frame and provided with a series of recesses, a member having a shank portion and a hooked end engageable with any one of said recesses, and means adjustably carried by the shank portion of said member for engagement with a vehicle to anchor the same on said frame.

10. In a transportation means of the class described, a main frame, a floor for said main frame, said floor being provided with an elongated slot, an elongated member fixed to the under face of said floor adjacent said slot, a rod having a hooked end engageable with said elongated member at one point throughout the length thereof and projecting upwardly through said slot, a structural member adjustably mounted on said rod above said floor, and means carried by said structural member and engageable with a vehicle for anchoring the same in position on said floor.

In testimony whereof I affix my signature.

IRVING H. JUDD.